United States Patent [19]

Taylor et al.

[11] 4,146,326
[45] Mar. 27, 1979

[54] DOCUMENT HANDLING APPARATUS AND REPRODUCING MACHINE

[75] Inventors: Thomas N. Taylor, Rochester; Charles J. Mahler, Fairport, both of N.Y.

[73] Assignee: Xerox Corporation, Stamford, Conn.

[21] Appl. No.: 811,735

[22] Filed: Jun. 30, 1977

[51] Int. Cl.² .................. G03G 21/00; B65H 9/06; G03G 15/00
[52] U.S. Cl. .................. 355/3 SH; 271/246; 355/75
[58] Field of Search .................. 355/3 R, 3 SH, 3 BE, 355/16, 75, 76; 271/243, 245, 246, 275

[56] References Cited

U.S. PATENT DOCUMENTS

| 1,424,260 | 8/1922 | Richards | 271/246 |
| 3,256,009 | 6/1966 | Reilly | 271/246 |
| 3,430,947 | 3/1969 | Davis | 271/246 |
| 3,630,519 | 12/1971 | Spear | 271/246 |

Primary Examiner—Fred L. Braun

[57] ABSTRACT

A document handling apparatus and a reproducing machine employing it, include a system for pre-registering a document prior to its advancement to a viewing station. A stop member is selectively positionable in and out of a path of the document. A guide chute defines a desired throat for guiding the document into engagement with the stop member. A system is provided for transporting the document to the viewing station. The guide chute is supported for movement in a direction away from the stop member in response to the movement of the stop member between its respective positions in and out of the document path.

12 Claims, 15 Drawing Figures

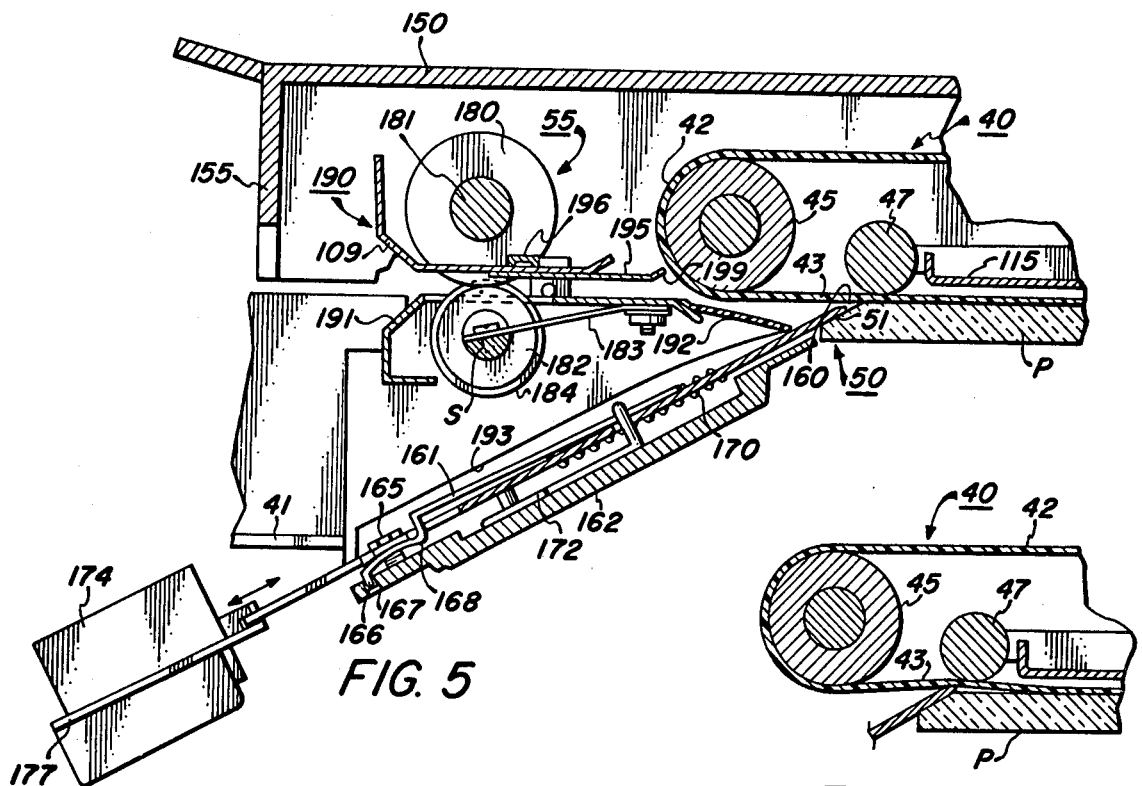
FIG. 5
FIG. 12
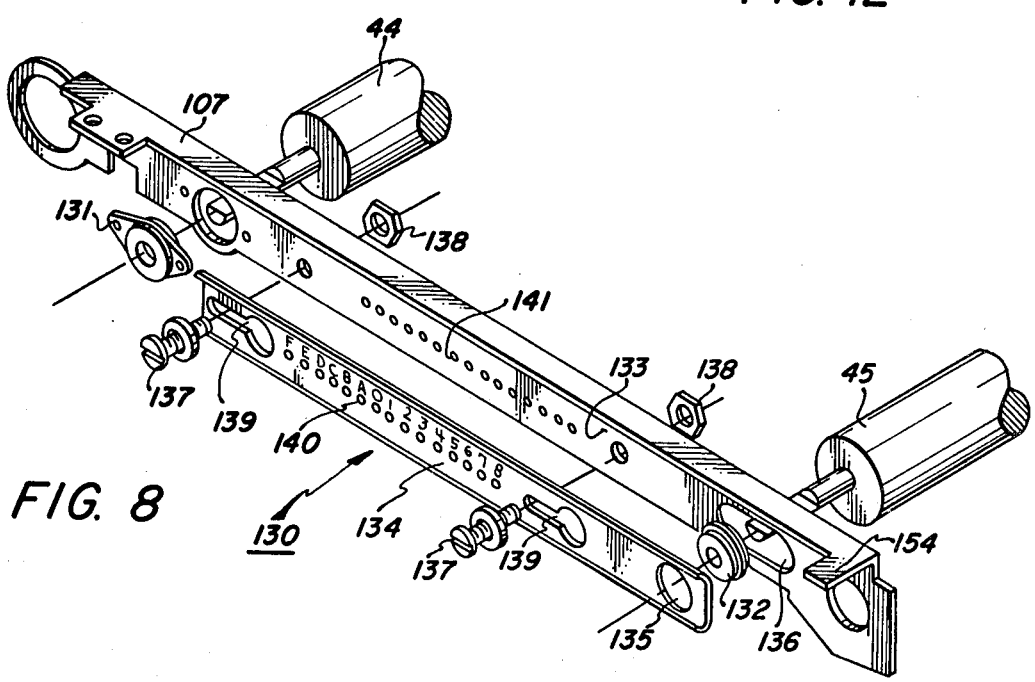
FIG. 8

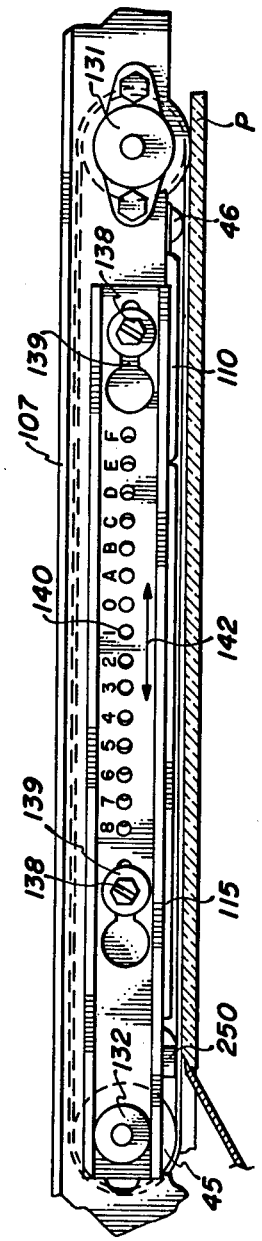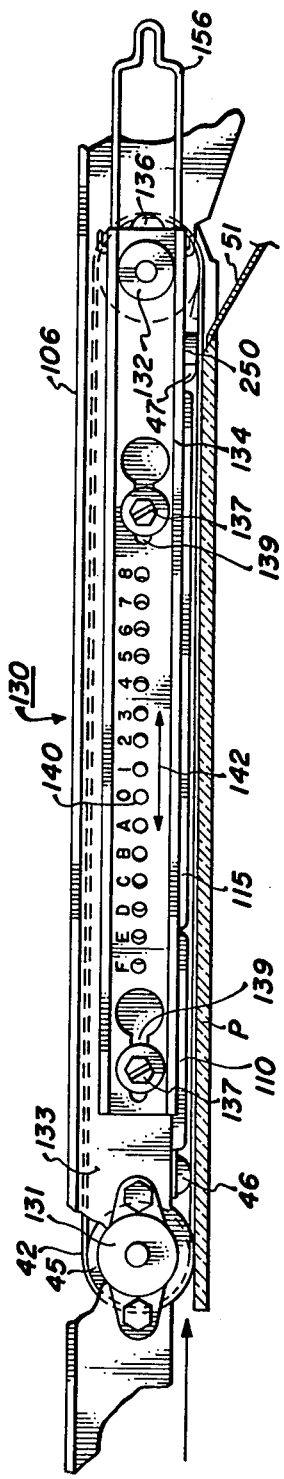
FIG. 9
FIG. 10

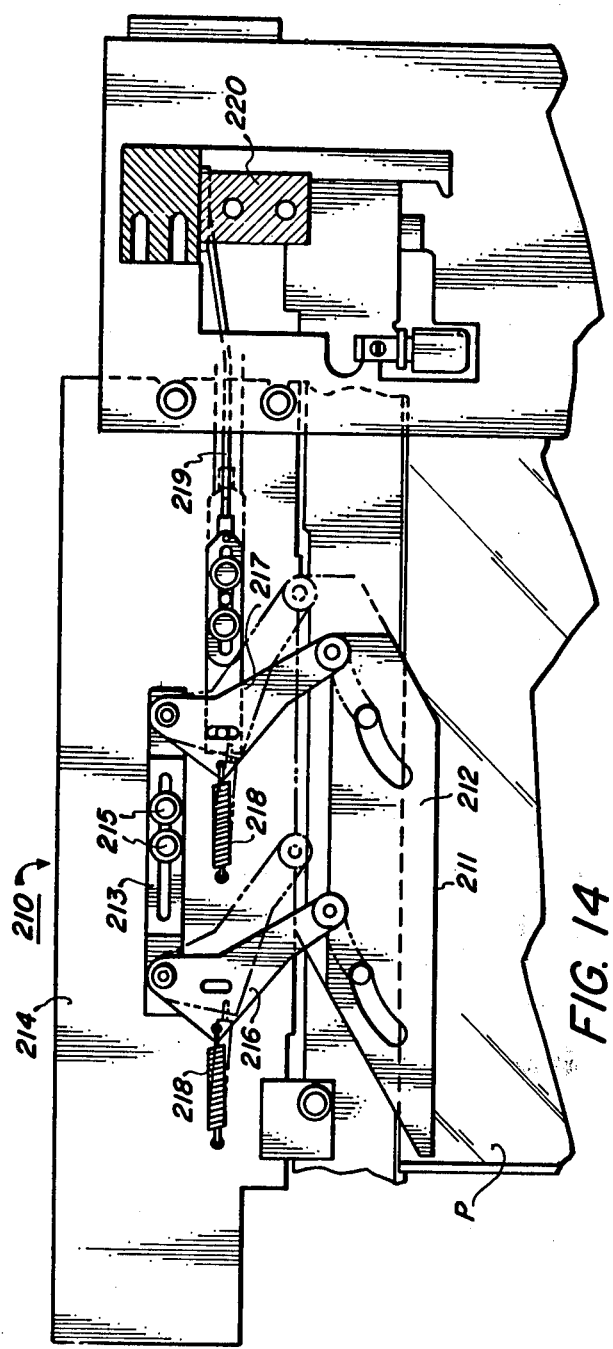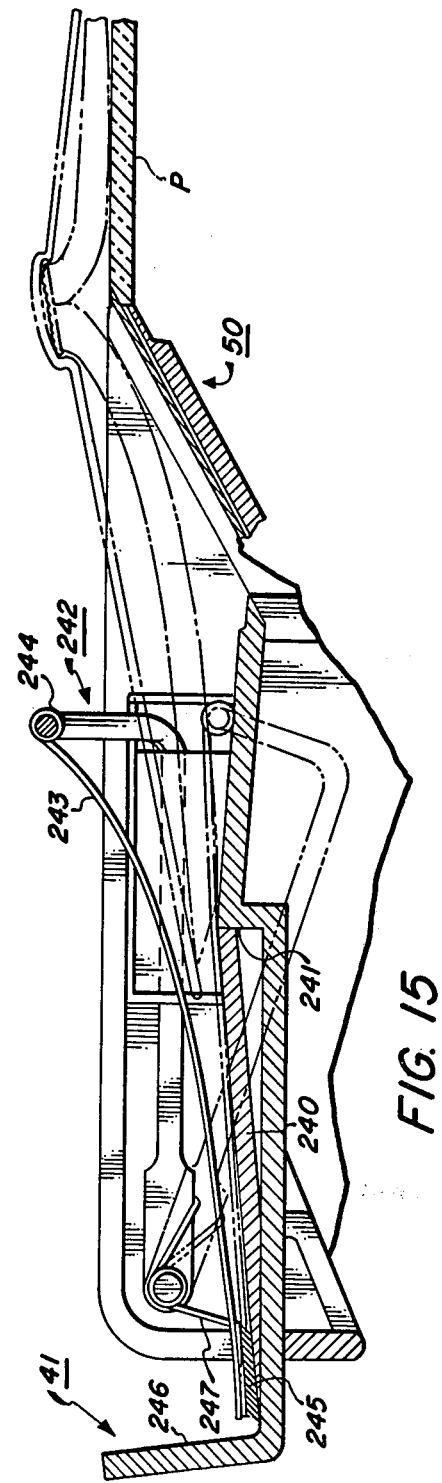

DOCUMENT HANDLING APPARATUS AND REPRODUCING MACHINE

BACKGROUND OF THE INVENTION

This invention relates to a document handling apparatus for advancing documents on and off a viewing station of a reproducing machine. An improved pre-registration system is provided which limits the thickness of a document which may be inserted into the document handler and provides improved reliability and reduced propensity for document damage. A reproducing machine employing the document handling apparatus also forms part of the invention.

PRIOR ART STATEMENT

Several reproducing machines currently commercially available employ document handling systems for advancing documents on and off the viewing station of the machine. The document handling systems presently in use may be classified as semi-automatic when the documents are individually manually inserted into the document handler which then feeds them on and off the viewing platen. In some machines fully automatic document handling systems are employed wherein the documents are automatically separated from a stack thereof and serially fed to the platen. In some cases provision has been made to recirculate the documents so that they may be serially fed on and off the platen a desired number of times to form a desired number of sets.

The present invention is particularly adapted for use with document handling systems which employ a single stretch-type document handling belt as the platen transport. Such document handling systems are exemplified by the following U.S. Pat. Nos. 3,565,420 to Howard, 3,889,943 to Krayer, and 3,941,376 to Liechty. In each of these patents a single wide document transport belt is utilized to advance a document on and off the viewing platen of the reproducing machine in a fully automatic or recirculating fashion. This approach is used commercially in the Xerox 9200 duplicator.

U.S. Pat. Nos. 3,844,552 to Bleau, 3,908,986 to Bleau, 3,910,570 to Bleau, are illustrative of semi-automatic type document handling systems. Such systems include a pre-registration station into which the operator manually places a document which is either manually registered against a stop or automatically registered against the stop as in the Bleau U.S. Pat. No. 3,908,986. U.S. Pat. No. 3,936,041 to Shiina, et al. is illustrative of a fully automatic document handling system wherein documents are separated from a stack and then advanced on and off the platen all automatically without operator intervention.

In addition to the aforenoted patents, the following disclosures are believed to be of interest with respect to document handling systems of the type contemplated in accordance with this invention. IBM Technical Disclosure Bulletin, Vol. 19, No. 5, Oct. 1976, pages 1589 to 1591, discloses a semi-automatic document handling system control arrangement employing multiple sensors. IBM Technical Disclosure Bulletin, Vol. 17, No. 4, September 1974, page 1131, discloses a platen registration gate mechanism. IBM Technical Disclosure Bulletin, Vol. 17, No. 4, September 1974, page 1135, discloses an output tray stacking system which could be employed with a document handling system. The output tray stacker includes a wire guide for decelerating documents entering the tray.

U.S. Pat. Nos. 1,098,234 to Dexter, 2,936,170 to Herrick, et al., 3,517,923 to Hoffman, et al., 3,963,339 to Taylor, et al., and 4,023,792 to Punnett, et al. are illustrative of registration systems commonly employed in the sheet feeding art. In each of these systems a stop member is selectively positionable into and out of the sheet path. Guide chutes are arranged to guide the sheet into engagement with the stop member when it is positioned in the sheet path. The Taylor, et al. patent shows a combination stop member and guide chute. When the stop member is in its operative position, the associated guide chute defines a limited throat into which the sheet is advanced. When the stop member moves out of sheet blocking position, the throat defined by the guide member is widened.

Hoffman, et al. and Punnett, et al. are illustrative of registration systems wherein a registration gate is arranged in association with a sheet transport device. The sheet transport device disclosed in these patents comprises a pair of pinch rolls which are separated during the registration operation and which close to advance the sheet in response to the movement of the registration gate out of its sheet blocking position.

It has been found in accordance with the present invention that document handling systems, particularly of the semi-automatic type, can subject a stalled document to damage by its being punctured by the registration gate as it moves into sheet blocking position while the document is positioned over it. It has further been found desirable to limit the thickness of a document which may be fed into the document transport by limiting the throat of the entrance opening defined by the input chute. When a limited throat is employed, however, the chute can cause a drag on the document as it is advanced to the viewing station.

SUMMARY OF THE INVENTION

This invention relates to a document handling apparatus adapted to place documents on and off a viewing station of a reproducing machine and a reproducing machine utilizing the document handling apparatus. The document handling apparatus includes a system for pre-registering the document prior to its advancement to the viewing station.

In accordance with this invention a pre-registration input chute has been devised which can reduce the propensity of the document handling apparatus to damage documents and improve the reliability of the apparatus.

The pre-registration system comprises a stop member which is selectively positionable into and out of the path of the document and a guide chute which is positioned along the path and adjacent to the stop member. The guide chute defines a desired throat for guiding the document into engagement with the stop member and for limiting the thickness of a document which can be inserted into the apparatus. A transport device associated with the pre-registration system is arranged to transport the document to the viewing station.

In accordance with this invention means are provided for supporting the chute for movement in a direction away from the stop member in response to the movement of the stop member between its respective positions in and out of the document path.

The chute support means preferably functions to move the chute away from the stop member in response to the movement of the stop member to its position out of the document path. This results in the throat defined by the chute being widened to reduce the drag on the document as it is advanced by the transport device.

The means for supporting the chute preferably alternatively or conjointly functions to move the chute away from the stop member when the stop member is moved into its sheet blocking position while a document is stalled in interference with the movement of the stop member. The movement of the chute away from the stop member in response to this occurrence prevents the stop member from puncturing or otherwise damaging the document.

Preferably the chute is supported to be pivoted away from the stop member.

Accordingly, it is an object of the present invention to provide an improved document handling apparatus.

It is a further object of this invention to provide a document handling system as above including an improved pre-registration system.

It is a further object of this invention to provide an improved pre-registration system as above including a guide chute arranged for movement away from a stop member in response to the operation of the stop member.

These and other objects will become more apparent from the following description and drawings.

BRIEF DESCRIPTION OF THE DRAWINGS

FIG. 5 is a partial cross-sectional view of the output transport and platen registration mechanism of the document handling apparatus.

FIG. 8 is an exploded view of the adjustable side frames and drive rollers of the platen belt transport.

FIG. 9 is a partial side view of the front adjustable side frame of the platen belt transport.

FIG. 10 is a partial side view of the rear adjustable side frame of the platen belt transport.

FIG. 12 is a partial cross-sectional view of the output transport and platen registration mechanism of FIG. 5 at a different stage of its operation.

FIG. 14 is a partial top view showing the retractable manual registration guide.

FIG. 15 is a partial cross-sectional view of the output tray and document decelerator associated with the document handling apparatus.

DETAILED DESCRIPTION OF THE PREFERRED EMBODIMENTS

Figure 1:
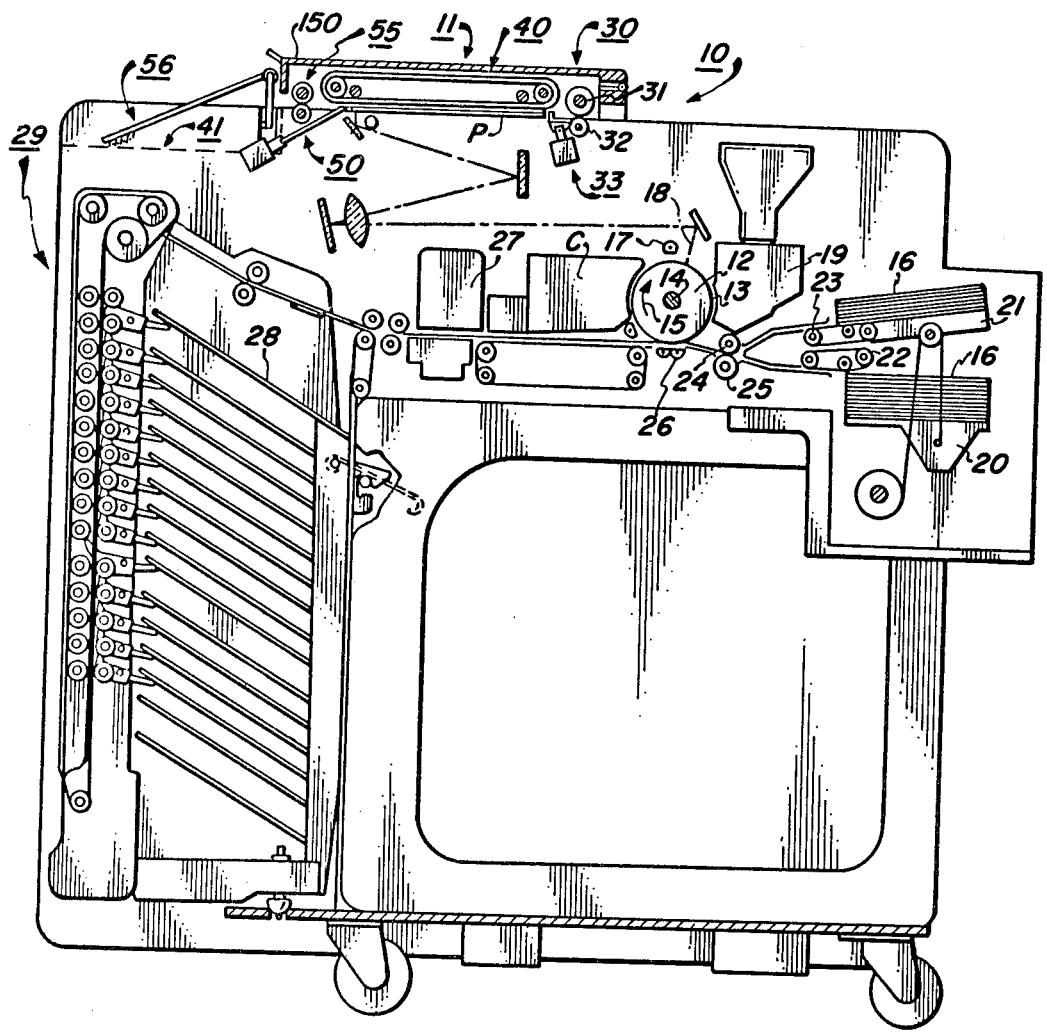
FIG. 1 is a schematic representation of a reproducing apparatus including a document handling system in accordance with this invention.

Referring now to FIG. 1 there is shown by way of example an automatic xerographic reproducing machine 10 which includes a document handling apparatus 11 of the present invention. The reproducing machine 10 depicted in FIG. 1 illustrates the various components utilized therein for producing copies from an original. Although the apparatus 11 of the present invention is particularly well adapted for use in an automatic xerographic reproducing machine 10, it should become evident from the following description that it is equally well suited for use in a wide variety of processing systems including other electrostatographic systems and it is not necessarily limited in its application to the particular embodiment or embodiments shown herein.

The reproducing machine 10 illustrated in FIG. 1 employs an image recording drum-like member 12, the outer periphery of which is coated with a suitable photoconductive material 13. One type of suitable photoconductive material is disclosed in U.S. Pat. No. 2,970,906, issued to Bixby in 1961. The drum 12 is suitably journaled for rotation within a machine frame (not shown) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input scene information is recorded upon a sheet of final support material 16 such as paper or the like.

The practice of xerography is well known in the art and is the subject of numerous patents and texts including *Electrophotography* by Schaffert, and *Xerography and Related Processes* by Dessauer and Clark, both published in 1965 by the Focal Press.

Initially, the drum 12 moves the photoconductive surface 13 through a charging station 17. In the charging station 17, an electrostatic charge is placed uniformly over the photoconductive surface 13 preparatory to imaging. The charging may be provided by a corona generating device of the type described in U.S. Pat. No. 2,836,726, issued to Vyverberg in 1958.

Thereafter, the drum 12 is rotated to exposure station 18 wherein the charged photoconductive surface 13 is exposed to a light image of the original input scene information whereby the charge is selectively dissipated in the light exposed regions to record the original input scene in the form of a latent electrostatic image. A suitable exposure system may be of a type described in U.S. Pat. No. 3,832,057, issued to Shogren in 1974. After exposure drum 12 rotates the electrostatic latent image recorded on the photoconductive surface 13 to development station 19 wherein a conventional developer mix is applied to the photoconductive surface 13 of the drum 12 rendering the latent image visible. A suitable development station is disclosed in U.S. Pat. No. 3,707,947, issued to Reichart in 1973. That patent describes a magnetic brush development system utilizing a magnetizable developer mix having coarse ferromagnetic carrier granules and toner colorant particles. The developer mix is brought through a directional flux field to form a brush thereof. The electrostatic latent image recorded on the photoconductive surface 13 is developed by bringing the brush of developer mix into contact therewith.

Sheets 16 of final support material are supported in a stack arrangement on an elevating stack support tray 20 or in an auxiliary tray 21. Sheet separators 22 and 23 selectively feed individual sheets from their respective stacks to a registration system which includes rolls 24 and 25. The sheet is then forwarded to the transfer station 26 in proper registration with the image on the drum. The developed image on the photoconductive surface 13 is brought into contact with the sheet 16 of final support material within the transfer station 26 and the toner image is transferred from the photoconductive surface 13 to the contacting side of the final support sheet 16. The final support material may be paper, plastic, etc., as desired.

After the toner image has been transferred to the sheet of final support material 16 the sheet with the image thereon is advanced to a suitable fuser 27 which coalesces the transferred powder image thereto. One type of suitable fuser is described in U.S. Pat. No. 2,701,765, issued to Codichini, et al. in 1955. After the fusing process the sheet 16 is advanced selectively to a suitable output device such as tray 28 or sorter 29.

Although a preponderance of the toner powder is transferred to the final support material 16, invariably some residual toner remains on the photoconductive surface 13 after the transfer of the toner powder image to the final support material. The residual toner particles remaining on the photoconductive surface 13 after the transfer operation are removed from the drum 12 as it moves through a cleaning station C. The toner particles may be mechanically cleaned from the photoconductive surface 13 by any conventional means as, for example, the use of a blade as set forth in U.S. Pat. No. 3,740,789, issued to Ticknor in 1973.

A document handling system 11 of this invention is used to advance documents on and off a viewing platen P where they are scanned by the optical system 18.

It is believed that the foregoing description is sufficient for purposes of the present application to illustrate the general operation of an automatic xerographic copier 10 which can embody the apparatus 11 in accordance with the present invention.

Referring now to FIGS. 1 through 5, the basic elements of the document handling system 11, in accordance with the present invention, will be described along with their operation. The document handler 11 includes an input transport 30 comprised of input pinch rolls 31 and 32, which are selectively disengageable so that a document may be readily placed between them. The input transport 30 also includes a wait station 33 for pre-registering the document. The wait station 33 is comprised of a pivotally supported registration gate 34 and a pivotally supported upper chute 35. The gate 34, chute 35, and pinch rolls 31 and 32 are inter-connected so that when the gate is up in a sheet 16 blocking position, the pinch rolls are separated. As the gate 34 drops out of sheet blocking position the pinch rolls come together to advance the document into the next station which comprises the belt-type platen transport 40.

A suitable static eliminating device 36 is arranged between the input transport 30 and the platen belt transport 40. In the embodiment shown in FIG. 3, the static eliminator 36 is comprised of a pin-type corona generating device wherein a plurality of pins are spaced transversely to the direction in which the document is moving. The corona generator is arranged to spray the document with an appropriate AC corona to neutralize or discharge any static build-up on the document before it enters the platen transport 40. While it is unusual to place the static eliminating device 36 before the platen belt transport 40, it has been found effective at such a location for reducing the static build-up on the belt and for providing adequate stacking of documents in the output tray 41. For the sake of simplicity the static eliminator 36 is shown solely in FIG. 3, and has been removed from the other views of the apparatus 11 in order to reveal other components.

Referring to FIGS. 1 through 5, the platen belt transport 40 is comprised of a single wide belt 42 having one run 43 over the platen P. This is desirable to avoid the print-out of the belt on the resulting copy sheet. The belt 42 is normally formed of a stretch-type material which is white in color so as to reduce the occurrence of a black border print-out on the copies. The belt 42 is wrapped about two pulleys 44 and 45, which are arranged so that the belt surface at the bottom of a pulley is slightly above the surface of the platen, perhaps by about 0.030 inches. The sag of the belt 42 is sufficient so that the belt engages the platen. The drive force which the belt 42 imparts to the document is controlled by means of back-up rolls 46 and 47, supported internally of the belt.

The input back-up roll 46 is arranged close to the input drive pulley 44, and controls the normal force applied by the belt 42 to the document as it is driven onto the platen P. A platen registration gate 50 is provided at the far end of the platen P. The document is driven by the belt 42 against the gate 50 in order to properly position the document on the platen P for imaging. During the imaging cycle the registration gate 50 is retracted. After imaging the document is advanced off the platen P by means of the belt transport 40 and a set of output pinch rolls 55. The output pinch rolls corrugate the document to increase its beam strength so that it will properly stack in the output tray 41 of the document handling system 11. Document decelerators 56 associated with the output tray 41 act upon the document at it enters the output tray to properly stack it therein.

Figure 2:
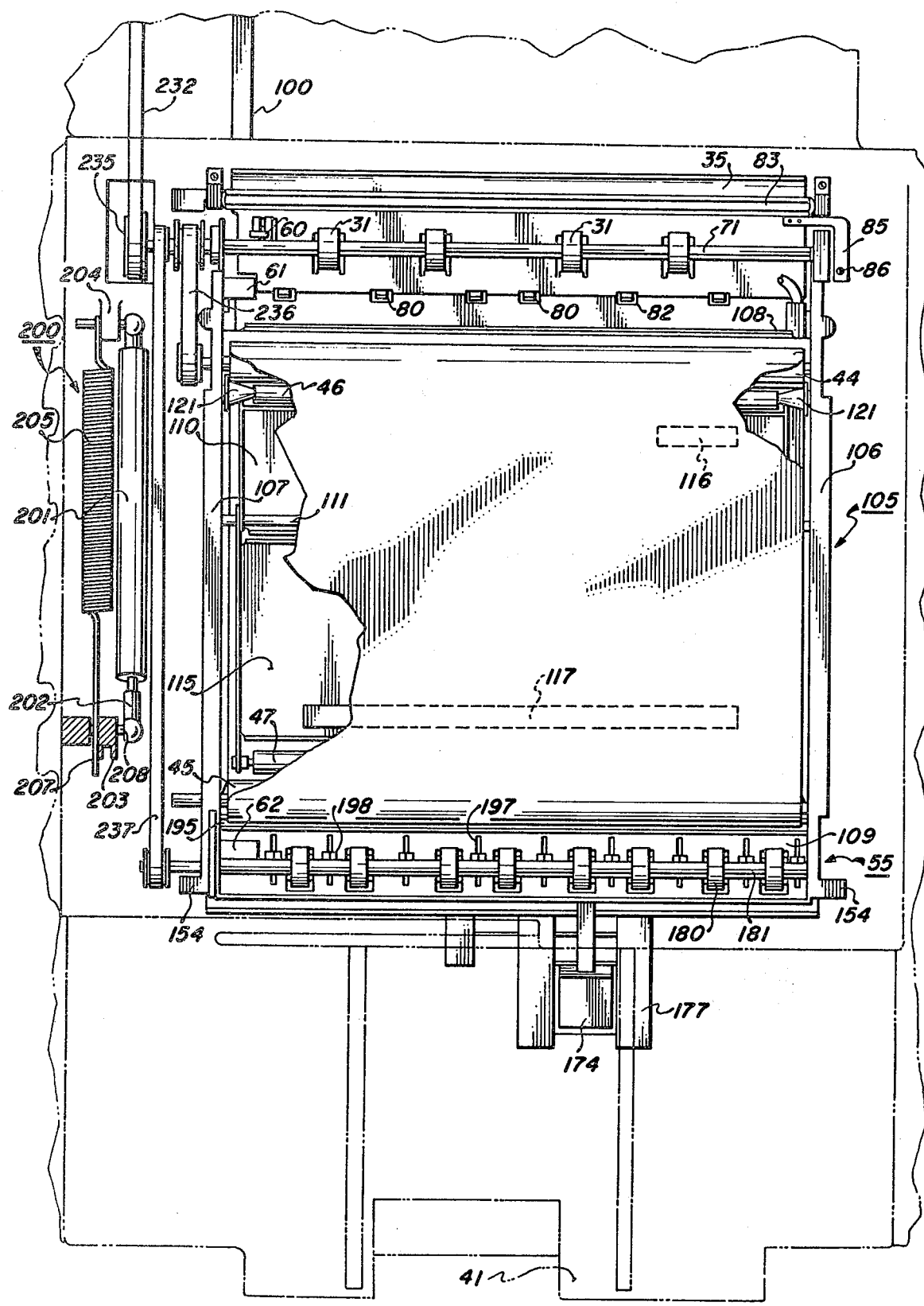
FIG. 2 is a partial top view of the document handling system of FIG. 1 with the cover removed.

The document handling system is actuated by a number of sensors as in FIG. 2. A lever actuated switch 60 is positioned just ahead of the nip of the input transport rolls 31 and 32 and serves to condition the machine for operation in a document handling mode. A second sensor 61, which preferably comprises a photocell, is arranged to sense proper corner registration of the document at the wait station 33. A third sensor 62 also preferably comprising a photocell is used to detect that the document has been advanced off the platen P. The third sensor is arranged just prior to the output pinch rolls 55.

In operation the document handling system 11 is activated by inserting a document into the wait station 33. This actuates the mode switch 60 which in turn activates the input sensor 61 and signals the logic (not shown) of the machine that a "DHS" copy is desired. When the corner of the document interrupts the input registration sensor 61, a ready-to-feed light is lit, and the system is assured that the original has been inserted within a predetermined skew and side shift tolerance. The logic then provides a 0.4 second delay after the start-print button is pressed, or after a second document is inserted when in a chain feed mode. This allows the operator time to let go of the document before it is advanced onto the platen P.

Figure 13:
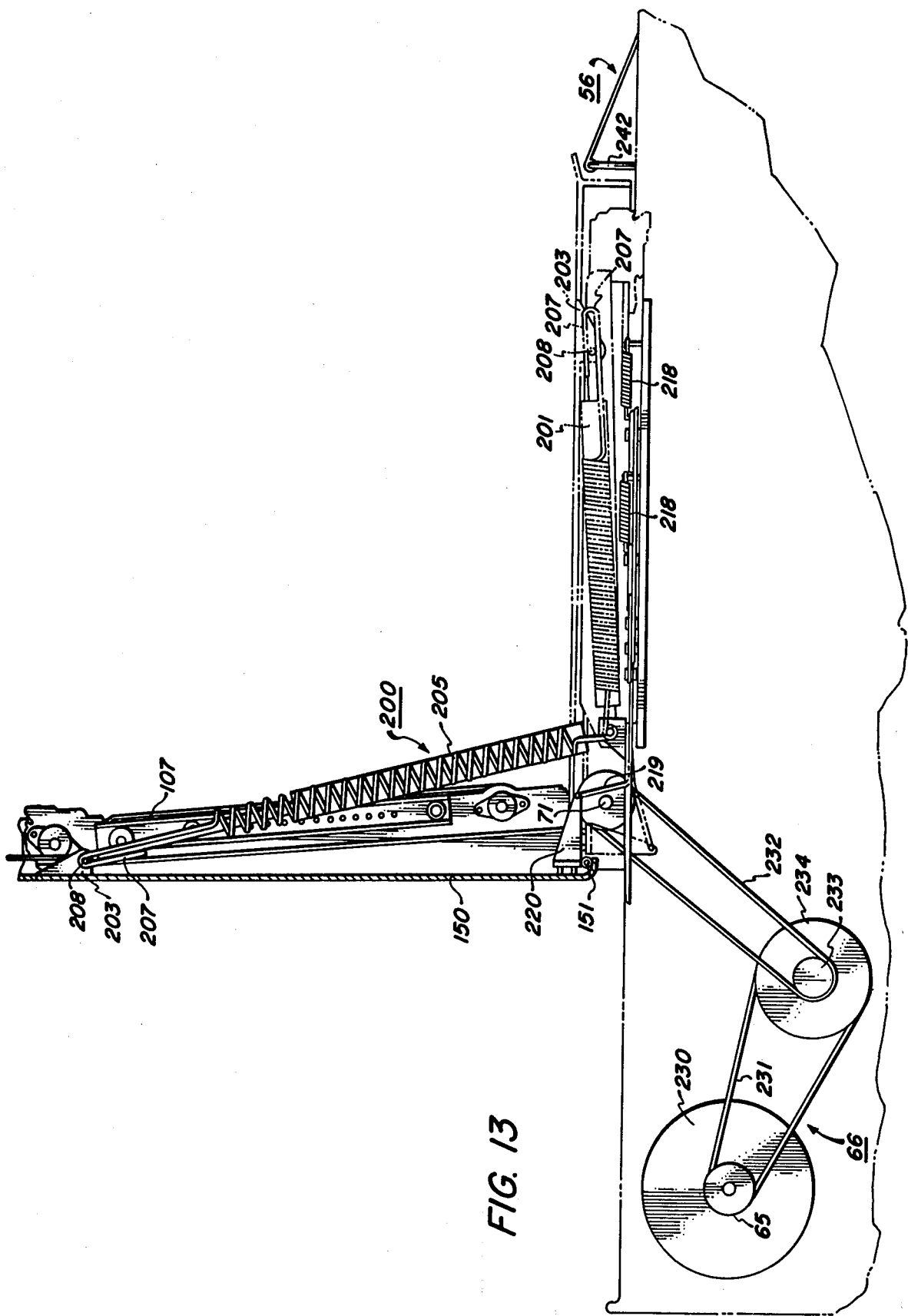
FIG. 13 is a rear view in partial cross-section showing operation of the platen cover counterbalance mechanism and the retractable manual registration guide.

As the wait station 33 fingers 34 retract, the pivoting upper chute 35 is raised which increases the clearance for bulky originals. At the same time the input rolls 31 and 32 pinch is made. A short time later a clutch 65, as in FIG. 13, is actuated and the drives 66 are started. The document is driven onto the platen P by the input rolls 31 and 32 and by the input back-up roll 46 of the belt transport 40.

In the event that a document does not uncover the input sensor 61, a jam is signaled. At an appropriate time the register edge 51 is raised from its normally retracted position. This also raises the registration back-up roll 47 as well. The document is driven against the register edge 51 by the document belt alone, removing any skew by coast over-drive. The register edge 51 is lowered during scan of the exposure system 18.

When scan is complete the drives 66 start again. If a second document has been properly inserted into the wait station 33 during scan, this document will be transported onto the platen P at the same time the first document is fed off. If the second original has not been inserted soon enough to allow the wait station 33 to be actuated, it will be held up at the wait station until the first document is driven off the platen P.

The registration back-up roll 47 provides the necessary normal force to drive the first document off the platen. If this document does not reach the exit sensor 62 within an alloted time, the logic signals a jam. The exiting document is fed into the exit tray 41 by the output rolls 55 which corrugate it to provide the beam strength needed to stack easily. Failure to leave the exit sensor 62 at the end of a cycle signals a jam.

Having thus described the general features of the document handling system 11 of this invention and its general mode of operation, further detail will now be given for the various sub-assemblies and sub-systems which make up the document handler.

WAIT STATION AND INPUT TRANSPORT

Referring now to FIGS. 2, 3, 6, and 7, the wait station and input transport will be described in greater detail. The wait station 33 and input transport 31 and 32 are supported by a structurally rigid casting or frame member 70 which is connected to the optical frame (not shown) in such a manner as to align the wait station 33 with the optical system 18 to ensure that the input transport 31 and 32 advances the document properly onto the platen P without skew of misregistration. The input transport is comprised of a set of pinch rolls 31 and 32. The four spaced apart upper rolls 31 are mounted to the input roll drive shaft 71 and are used to drivingly engage the document for advancement onto the platen P. The lower input pinch rolls 32 are supported in cantilever fashion by spring members 72 secured to the input frame member 70. Two of the lower input rollers 32 are rotatably supported to idle upon a first shaft 73, and the other two are rotatably supported to idle upon a separate second shaft 74. This helps to provide a uniform normal force between the pinch rollers when they are engaged. The near side lower input pinch roller 32 includes a reduced diameter shoulder 75 so that it will not engage the very end of an 8½ × 11 inch sheet. This reduces the propensity for skewing such sheets.

The pre-registration gate member 34 includes spaced apart registration stop fingers 80. It is pivotally supported below the input station frame member 70 upon shaft 81 so that the fingers 80 project through openings 82 in the frame member. Initially the registration fingers 80 are supported as in FIG. 3 in raised position so as to block a document from entering the nip between the transport belt 42 and the platen P.

The upper registration chute 35 is also arranged to be pivoted about a shaft 83. When the registration fingers 80 are in their operative, or raised position, the upper registration chute 35 is in its lowered position as in FIG. 3. The upper registration chute 35 serves to limit the thickness of a document which can be inserted into the wait station 33 as well as serving to prevent documents from jumping the pre-registration gate 34. The upper chute 35 is biased in a counterclockwise direction about its pivot axis by gravity. Should a document remain lodged over the pre-registration gate fingers 80 when the gate is raised, the document will not be punctured since the upper chute 35 merely pivots upwardly.

Figure 3:
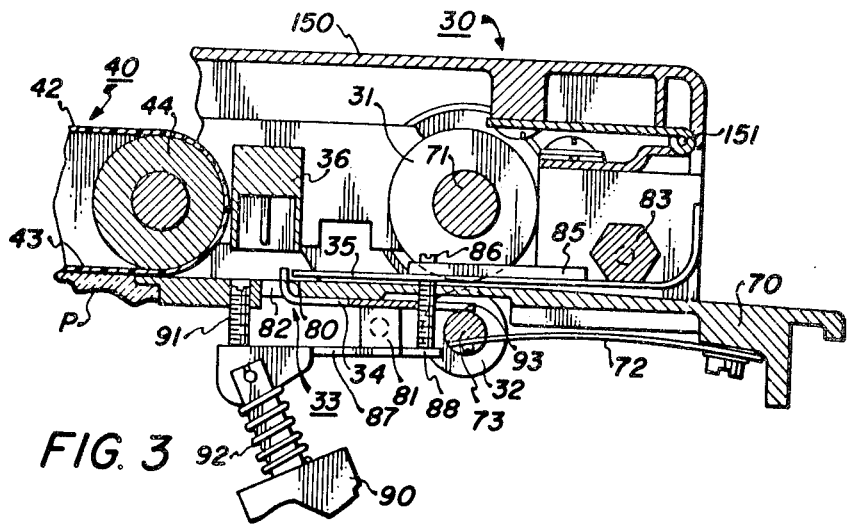
FIG. 3 is a partial sectional view of the input transport and wait station of the document handling apparatus.
Figure 6:
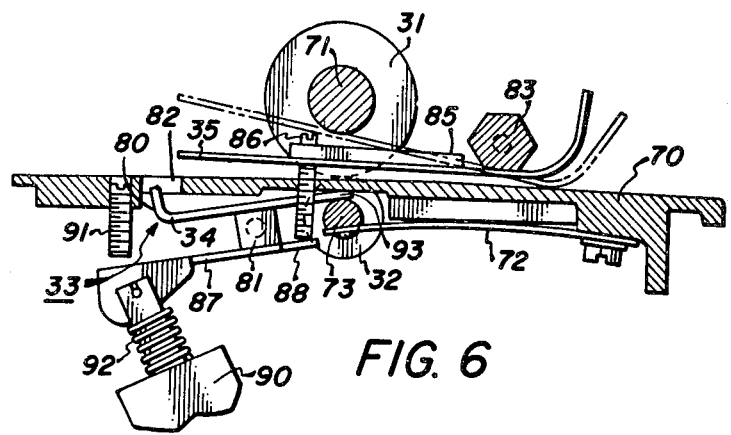
FIG. 6 is a partial sectional view of the input transport and wait station of FIG. 3 at a different stage of its operation.
Figure 7:
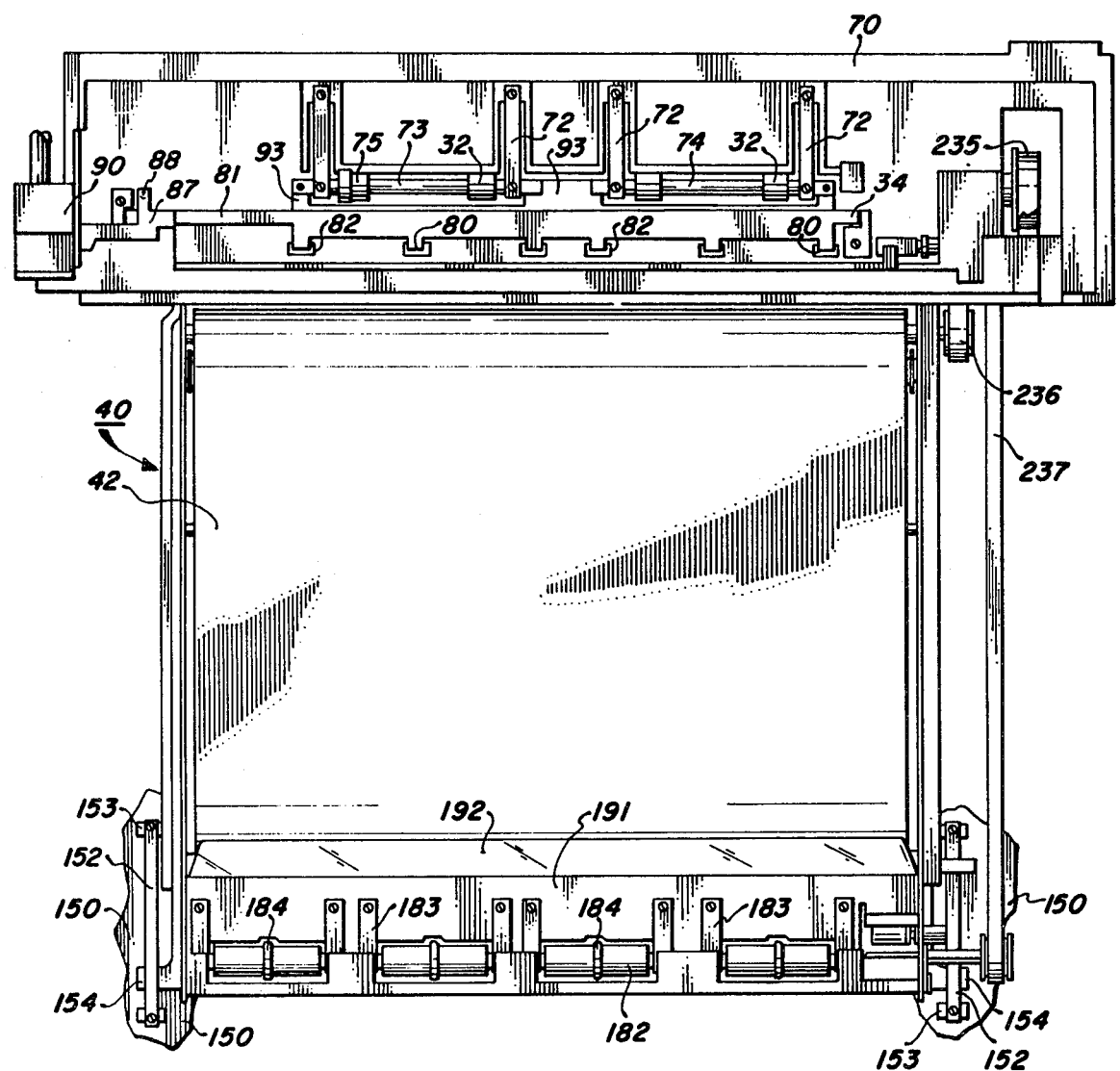
FIG. 7 is a partial bottom view of the document handling apparatus.

The upper chute 35 includes an arm 85 as in FIGS. 2, 3, and 6 having an adjustable set screw 86 therein. A plate-type actuating member 87 as in FIG. 7 is supported by the pre-registration gate 34 pivot shaft 81 and includes a tab 88 for engaging the set screw 86 connected to the upper registration chute 35. At the opposing end of this actuating member 87, a solenoid 90 is connected. In the operative position, as in FIG. 3, a set screw 91 in the input station frame 70 is used to limit the height to which the registration gate fingers 80 extend above the upper surface of the frame.

The positional arrangement shown in FIG. 3 comprises the operative position for pre-registering a document at the wait station 33. In this position the solenoid 90 is not actuated and a spring 92 biases the registration gate pivot shaft 81 so that the gate is normally in its raised position. The rear portion of the registration gate member 34 includes a plurality of tabs 93 as shown in FIG. 7 which engage the tops of the lower input roll shafts 73 and 74 at their ends so that when the fingers 80 are raised the tabs 93 deflect the lower pivot rolls 32 to separate them from the upper pinch rolls 31. This allows a sheet to be easily placed between the pinch rolls 31 and 32 and registered against the fingers 80.

To initiate the document handling mode of operation, a document is placed into the wait station 30 and up against the pre-registration fingers 80. The document is also registered against the input top cover registration strip 100 as in FIG. 2, to provide corner registration which is sensed by the input sensor 61.

After a suitable time delay the solenoid 90 is actuated to lower the input registration fingers 80 out of sheet blocking relationship as in FIG. 6. Since the registration member 34 has pivoted about its axis its tabs 93 no longer deflect the shafts 73 and 74 of the lower input rolls 30 so that the pinch of the input rolls 31 and 32 is closed to advance the document sandwiched therebetween into the belt transport station 40. The actuating member 87 connected to the registration member pivot shaft 81 operates upon the set screw 86 of the upper chute 35 to pivot it clockwise in order to widen the throat between it and the surface of the input frame casting 70. This serves to reduce the drag on the sheet as it is fed onto the platen. The upper chute 35 may be manually pivoted open even wider as shown in phantom to facilitate jam clearance. Therefore, upon actuation of the input station 30 solenoid 90, the fingers 80 are lowered, the upper chute 35 is raised, and the pinch of the input rolls 31 and 32 is closed to advance the document into the next station of the document handling system 11 which comprises the platen belt transport 40.

PLATEN BELT TRANSPORT SYSTEM

Referring now to FIGS. 2, 4, 5, 8, 9, 10, 11, and 12, the platen belt transport 40 will be described in greater detail. The platen belt transport 40 is supported within a frame assembly 105 comprised of front 106 and rear 107 adjustable side frame members, and input 108 and exit 109 end frame members. The frame assembly 105 is pivotally supported at the input station 30 about the input pinch roller drive shaft 71 by being suitably journaled thereabout.

The platen belt transport 40 is comprised of a single wide stretch-type belt which is arranged about the input drive pulley 44 and an exit idler pulley 45. Both the input and exit pulleys 44 and 45 are journaled for rotation in the front and rear adjustable side frames 106 and 107. Internally of the belt 42, an input back-up roll 46 is pivotally supported by means of a pan-like frame member 110. The input back-up roll is rotatably arranged at one end of the frame 110 member and the other end thereof is pivotally supported about a shaft 111 secured between the front and rear adjustable side frames 106 and 107 of the platen belt transport 40. A second pivotally supported pan-like frame member 115 is pivotally arranged at one end about the shaft 111 and rotatably supports the registration back-up roll 47 at its free end.

The frame member 110 supporting the input back-up roll 46 is shorter than the frame member 115 supporting the output back-up roll. The back-up rolls 46 and 47 are urged against the back of the belt 42 by their weight and the weight of their associated frame member 110 or 115. The normal force exerted by these rolls 46 and 47 against the belt 42 is important for obtaining the desired driving force between the belt and the document during advancement of the document. In order to provide the desired level of drive force, weights 116 and 117 are supported by the respective input and registration back-up roll frame members 110 and 115. Therefore, the normal force exerted by the back-up rolls 46 and 47 can be regulated by the size of the weights 116 and 117 and their positions on their respective pans 110 and 115.

It has been found that the platen P surface is not absolutely flat and that a variation occurs in the force with which the input back-up roll 46 urges the belt against the platen from the front to the back side of the platen. This can result in a significant loss in latitude for the setting of the input back-up roll normal force. Therefore, in accordance with one feature of the document handling system 11 herein, the input back-up roll is formed so that it includes two doughnut-shaped portions 120 or sections of enlarged diameter as in FIG. 4. These back-up roll sections 120 of enlarged diameter insure that the input back-up roll 46 applies a uniform pressure at the two points where it engages the platen belt 42 even if the platen P is not absolutely flat. This reduces the tendency for skewed feeding of the document onto the platen P. The aforenoted input back-up roll 46 construction results in a substantial improvement in the latitude of the platen belt transport reducing its sensitivity to the belt 42 tension and the height of the input drive pulley 44.

Cone-shaped members 121 rotatably supported about stub shafts mounted to the front and rear side frames 106 and 107 of the belt transport 40 are employed to insure that the belt properly tracks about the input and output pulleys 44 and 45. The long pan 115 is sufficiently flexible to insure adequate conformity of the registration back-up roll 47 across the platen. The front pan 110 is too short to assure such conformity, and, therefore, a slot 122 is provided in that pan. This slot 122 allows the pan to move about the pivot shaft 111 to insure conformity between the raised portions 120 of the roll 46 and the platen P, even if the platen is warped. The raised portions 120 of the input back-up roll 46 are arranged toward the rear of the document handler 11 so that it can properly handle shorter documents.

In order to balance the input back-up roll 46 loading the normal force assisting weight 116 is arranged toward the front side of the pan 110, thereby uniformly loading the roll against the belt 42 in the vicinity of the raised portions 120 of the roll.

VERNIER BELT TENSIONING SYSTEM

The vernier belt tensioning system 130 represents an inexpensive, high resolution system for obtaining a highly accurate setting of the parallelness of the pulleys 44 and 45. The system is capable of maintaining parallelness of the respective pulleys within about ± 0.005 to about ± 0.01 inches.

The cone-shaped members 121, which engage the upper run of the belt 42 at the front and rear sides thereof, are effective for overcoming minor excursions of the belt to maintain proper belt tracking. It is still required, however, that the input drive pulley 44 and the idler pulley 45 about which the belt 42 is supported, must be sufficiently parallel to avoid major excursions of the belt which would result in catastrophic loss of belt tracking. To insure this high degree of parallelness between the respective belt pulleys 44 and 45, a vernier belt tensioning system 130 is employed as shown in FIGS. 8–10.

The driving engagement between the belt 42 and the document is provided by the slack in the belt and the normal force applied through the belt by the input and registration back-up rolls 46 and 47. The normal force exerted by the belt against the document in the vicinity of the input and registration back-up rolls 46 and 47 plays a substantial roll in providing consistent skew-free feeding of the document. This normal force is controlled as aforenoted by the weight of the rolls and mounting assemblies 110 and 115. The belt 42 tension provides an off-setting force to the normal force of the rolls 46 and 47 by acting to lift the rolls away from the platen. The higher the belt tension the greater is the reduction in the effective normal force of the back-up rolls 46 and 47 at the platen. Therefore, it is important to be able to set the belt tension with a high degree of accuracy.

The belt tension is set for the document handling system 11 by means of the adjustable side frames 106 and 107 which include a vernier system 130 which allows the belt tension to be incremented in small amounts while maintaining the parallelness of the respective belt pulleys 44 and 45.

The drive belt pulley 44 is journaled for rotation in the front and rear side frames 106 and 107 by means of bearings 131. The idler pulley 45 is journaled for rotation by means of bearings 132 which are slidably sandwiched between the inner 133 and outer 134 vernier plates which comprise the adjustable side frames 106 and 107. The bearing 132 is positioned in a close fitting hole 135 in the outer plate 134 and slides within a slot 136 in the inner plate 133. The outer plate 134 is locked to the inner plate 133 by screws 137 and nuts 138 which are welded to the inner plate 133. Slots 139 in the outer plates 134 allow them to slide relative to the inner plates 133 for setting belt tension.

The vernier system 130 is comprised of a row of holes 140 spaced an equal distance apart arranged in the respective front and rear outer vernier plates 134. A second row of holes 141 spaced an equal distance, which is less that the spacing of the holes in row 140, are arranged in each of the respective inner vernier plates 133.

The difference in the hole spacings for the holes 140 in the outer vernier plates 134 as compared to the holes 141 in the inner vernier plates 133 provides the desired vernier type read-out when the rows of holes 140 and 141 are overlapped by application of the outer vernier side plates 134 to the inner vernier side plates 135. This difference in the hole 140 and 141 spacings in the vernier plates 133 and 134 results in only a single pair of holes in the respective plates 133 and 134 being completely aligned and concentric for any relative position of the vernier plates.

For example, if the difference in spacing for the holes 141 as compared to the holes 140 is about 0.03 inches then it is possible to adjust the vernier side plates 133 and 134 relative to one another accurately in intervals of 0.03 inches. Similarly, if the difference in the hole spacings were 0.01 inches, it would be possible to adjust the vernier side plates 133 and 134 in increments of 0.01 inches. Therefore, relative movement of the vernier side plates 133 and 134 in either direction of the arrow 142 in FIGS. 9 and 10 so that a new set of overlapped holes 140 and 141 lines up next adjacent to a previously aligned set of holes will result in a 0.03 incremental adjustment for a 0.03 inch difference in hole spacing.

The holes 140 in each vernier plate 134 are provided with indicia, as shown, such as numbers or letters. When a desired belt tension is achieved a pin is placed in the aligned vernier holes 140 and 141 of one side frame 106, for example, hole 0 in FIG. 9. The same holes 140 and 141 are aligned at hole 0 in the other side frame 107 and held by a pin. After the side frames 107 and 106 have thus been aligned and the proper belt tension set, the vernier plates 133 and 134 are locked in position by means of screws 137.

In order to set the belt tension, use is made of the relative movement between the document handler cover 150 and the document belt frame assembly 105. The frame assembly 105 is pivoted about the input roll drive shaft 71, whereas the cover is pivoted about a different hinge axis 151. This results in relative movement between the transport belt frame assembly 105 and the cover 150 when the cover is raised as in FIG. 13. The frame assembly 105 is slidingly secured to the cover by removable straps 152 mounted to bosses 153 on the cover. Tabs 154 on the side frames 106 and 107 slide on the straps 152 as the frames 105 slides down the cover 150 as the cover is raised.

To set the belt tension a fish scale or other suitable tension measuring device is secured between one end 155 of the cover 150 and a catch 156 which is secured on outer vernier plate 134. The screws 137 are loosened and the cover 150 is raised until the desired tension is reached, at which time note is taken of the vernier hole pair 140 and 141 which are aligned. A pin is then placed in that vernier hole pair. The cover 150 is then lowered and the tension measuring device removed. When the cover is raised again, a pin is similarly placed in the same hole pair 140 and 141 on the other side of the DHS frame assembly 105. The vernier plates 133 and 134 are then locked as aforenoted to maintain the desired belt tension and the desired parallinity between the respective belt pulleys 44 and 45.

PLATEN REGISTRATION SYSTEM

Figure 11:
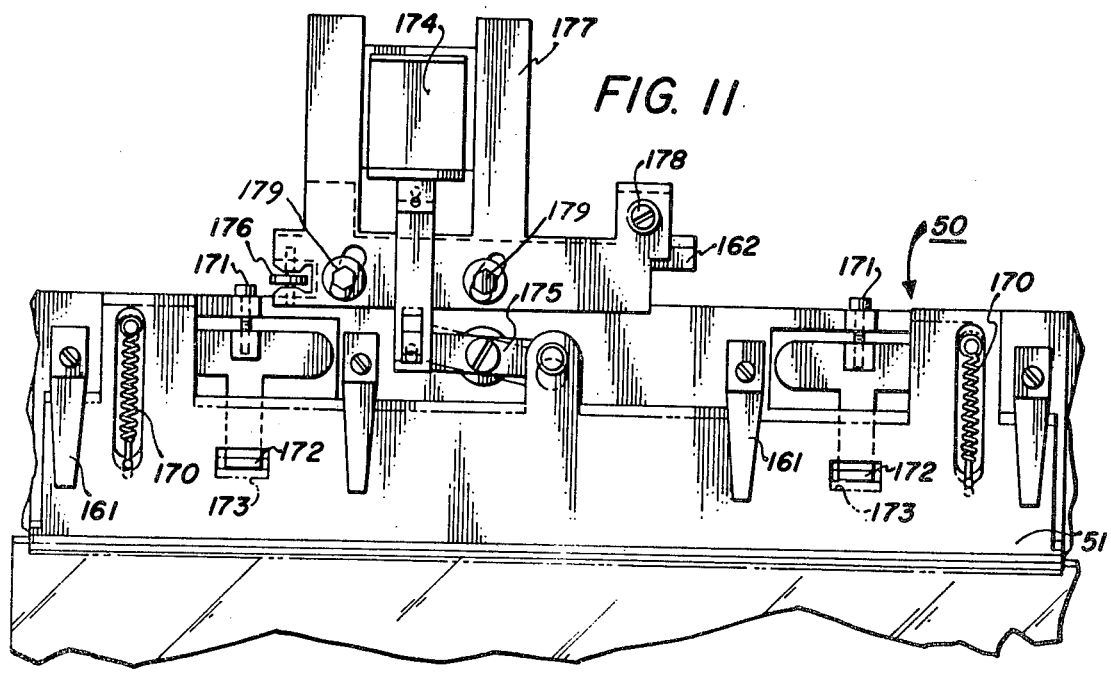
FIG. 11 is a partial top view of the platen registration mechanism.
Figure 4:
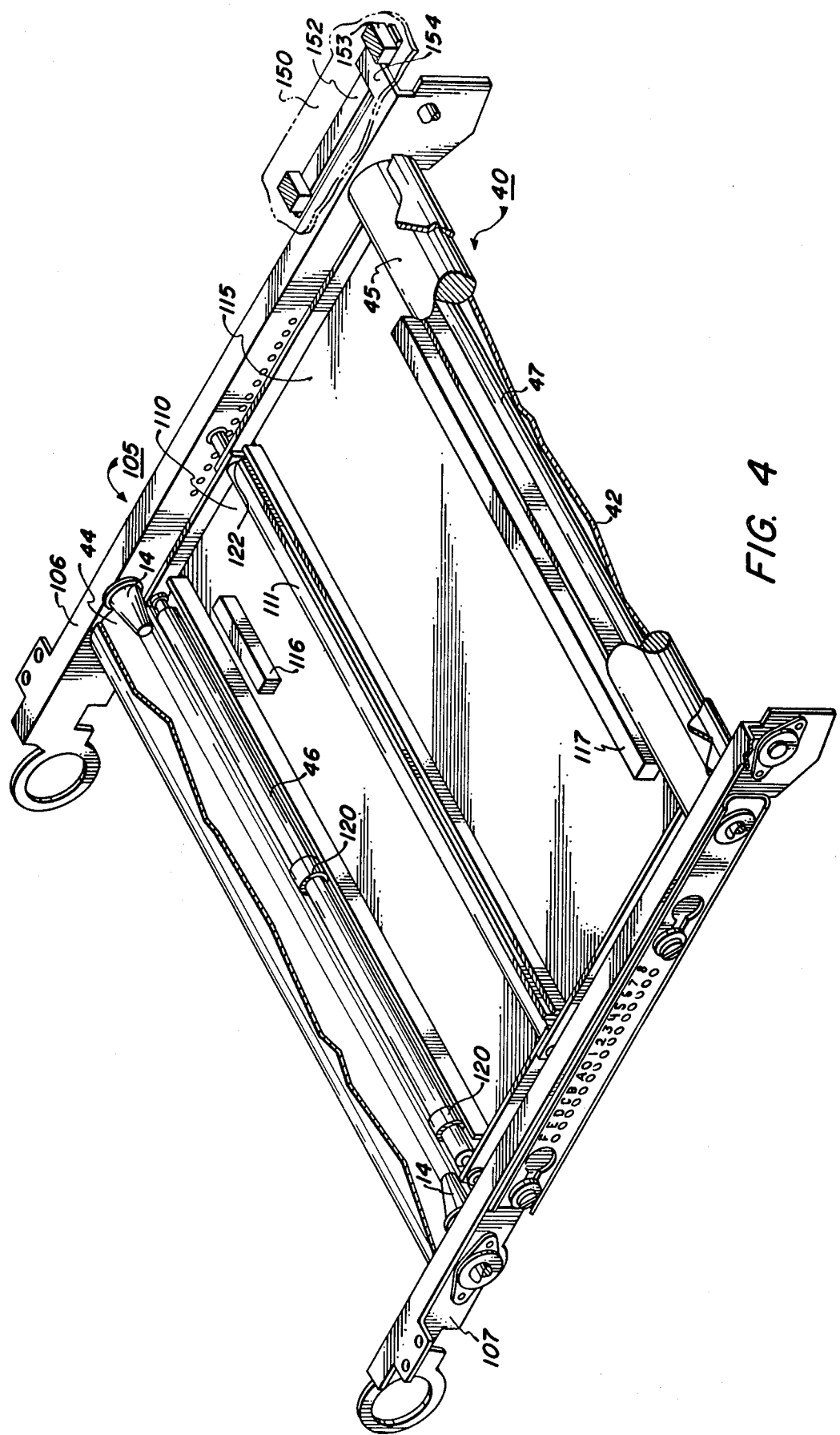
FIG. 4 is a partially cut-away perspective view of the platen belt transport of the document handling apparatus.

The purpose of the platen belt transport 40 is to advance the document onto the platen, and against the platen registration gate 51 so that the document can then be scanned by the optical system 18 to provide one or more copies. Referring to FIGS. 5, 11, and 12, the platen registration system 50 is shown in greater detail. The registration gate 51 comprises a plate-like member which is comparatively thin and sufficiently flexible to conform to the beveled edge 160 of the platen P. The registration gate 51 is arranged for movement in a plane which is inclined with respect to the plane of the platen P.

In the system which will be described the registration edge 51 is normally maintained in its retracted position as in FIG. 5. This is desirable in order to reduce the possibility of operator injury by engagement with the edge of the registration gate 51 when the platen cover 150 and document handler is raised off the platen. The registration gate 51 is raised into its operative position for registering a document on the platen as in FIG. 12 only when the document is fed onto the platen P. As soon as the document has been registered the gate 51 is retracted so that the document can then be fed off the platen at the end of the copy cycle.

To insure confirmity between the gate member 51 and the beveled edge 160 of the platen P, a plurality of springs 161, as in FIGS. 5 and 11, are arranged spaced apart across the plate member to bias the gate against the platen edge. Four springs 161 are shown. Each is secured to the registration gate frame 162 and urged against the gate member 51 in cantilever fashion. Because of the variability of the springs 161 the force exerted by each spring is adjustable so that proper conformity can be maintained between the registration gate 51 and the beveled edge 160 of the platen glass P. This adjustment is provided by the mounting screws 165 which hold the springs to the frame 162. One end 166 of the spring 161 is secured in a slot 167 in the registration gate frame 162 and the other end is urged against the gate surface. Tightening the screw 165 increases the spring pressure and loosening the screw 165 reduces the spring pressure. The spring 161 includes a step 168 which is cantilevered to allow the spring force adjustment. These springs 161 are operative to correct for edge bowing of the gate member 51 and for spring and casting 162 tolerances.

The registration gate 51 is arranged for sliding movement on the registration gate frame 162. It is urged to its retracted position by means of tension springs 170. Screw 171 adjustable stop members 172 are provided which include projections which pass through slots 173 in the registration gate 51 to limit its range of travel. Actuation of the gate 51 is provided by means of a solenoid 174 which is connected to the gate by means of a pivotally supported link 175. The operative stroke of the solenoid 174 is adjusted by means of an adjustment screw and wheel 176 embedded in the frame 162 which moves the solenoid support frame 177 with respect to the register edge frame 162 about pivot screw 178. Screws 179 lock the position of the solenoid frame 177 on the gate frame 162.

Referring to FIGS. 5 and 12, the operation of the platen registration gate is shown in greater detail. In its operative position, as in FIG. 5, the register edge 51 engages the belt 42 so as to raise the register back-up roll 47 off the platen to create a registration "pocket" as shown. This results in a decrease in the normal force of the belt against the document as it is advanced into registration against the gate 51. This is desirable since it reduces the occurrence of document damage. The document is advanced into engagement with the gate 51 by a coast overdrive of the belt transport 40. This removes any document skew and properly positions the document on the platen P for imaging.

After the document has been properly registered on the platen P, the gate 51 is withdrawn to its retracted position as in FIG. 5. This also results in dropping the register roll 47 back into engagement with the document through the belt 42 at a desired normal force which is effective to advance the document off the platen by actuation of the belt transport 40. If another document has been pre-registered in the wait station 33, it is fed onto the platen P simultaneously as the previous document is fed off the platen. If another document is not pre-registered, the first document is fed off the platen P before another document is fed on.

The document which is advanced off the platen P is fed into the nip of the output rolls 55. The output rolls 55, as in FIGS. 2, 5, and 7, comprise an upper set of rolls 180 supported about the output roll drive shaft 181. The lower set of idler rolls 182 are mounted on individual shafts S and cantilevered spring 183 biased for engagement with the upper output 180 rolls. The lower idler output rolls 182 include an enlarged diameter central ring 184 which is located between the engaging upper output drive rolls 180. This arrangement serves to corrugate the document as it is advanced by the output rolls 55 into the output tray 41. This aids in obtaining adequate travel of the document before it engages the other documents in the output tray so that it will properly stack in the output tray.

A guide chute 190 is associated with the output rolls 55. The lower guide chute 191 is extended by means of a Mylar strip 192 so it flexibly engages the registration gate cover 193 thereby preventing a sheet from being driven downwardly into the registration gate area rather than out through the output roll chute 190. The upper chute 194 also includes slidable extension 195 which it adjustably supports. The chute extension 195 comprises a plate member which includes a plurality of tabs 196 which extend through cooperating slots 197 in the upper chute as in FIG. 2. Leaf-type springs 198 are inserted through holes in the tabs 196 and serve to mount the adjustable chute extension 195 to the upper chute 194 so that it can be adjusted to provide a desired gap 199 with respect to the belt 42. This gap 199 preferably is on the order of about 0.03 inches so as to reduce the propensity for a document sheet to jam into the interface between the output rolls 55 and the belt transport 40.

COUNTERBALANCE MECHANISM

While most copying operations will be performed with the document handler 11 in its operative position over the platen P, it is also desirable for copying books, etc., to be able to manually locate documents on the platen. This is accomplished by raising the document handler cover 150 to lift the document handler off the platen. A counterbalance mechanism 200, as in FIGS. 2 and 13, is provided for off-setting the weight of the document handler 11 and cover 150 to make it easy to raise or lower them. The counterbalance mechanism 200 is comprised of a gas spring cylinder 201 of the general type which may be obtained from the Gas Spring Corporation, 17 Commerce Drive, Montgomeryville, Pa., and sold under Part Number 01111-B.

The gas spring cylinder 201 is pivotally secured at one end to a boss 204 on the input station frame casting 70. The gas spring piston rod 202 is pivotally secured at its free end to a boss 203 on the document feeder cover 150. Oil has been added to the gas spring cylinder 201 in order to provide a damping effect as the cover is raised or lowered. The oil in the gas spring cylinder causes it to act like a dash pot and prevents the cover 150 from falling too fast as it is closed. When the cover is at about 15° to the horizontal plane of the platen it falls closed since there is insufficient force in the gas spring cylinder to oppose its closing.

The force necessary to raise the cover 150 and its associated document handler 11 is not uniform throughout the range of motion of the cover. For example, as the cover 150 get more vertical the force of the cover and document handler against the gas spring cylinder is markedly reduced. To compensate for this reduction in the opposing force of the document cover 150 and handler 11, a compensating spring 205 is provided which is pivotally secured to the boss 204 on the input casting 70. The compensating spring includes a U-shaped hook 207 at its other end which rides on a pin 208 secured to the boss 203 of the document handler cover 150.

As the cover is raised to about 20° to the horizontal the compensating spring 205 begins to stretch and thereby apply a counter force to the gas spring cylinder 201. The amount of this compensating force increases as the document feeder cover is raised and the compensating spring 205 expands. This combination of the gas spring cylinder 201 and compensating spring 205 provides a more correlated force distribution on the cover 150 and document handler 11 to prevent a rapid—uncontrolled swing during the opening or closing thereof.

MANUAL REGISTRATION EDGE

When the document handler 11 is raised to do copying by manual placement of documents on the platen P, the normal document registration edge 51 is in its retracted position as described above. Therefore, it is necessary to provide some means for providing manual registration of a document on the platen P. This is achieved in accordance with this document handling system 11 by means of a retractable manual registration edge mechanism 210 as in FIGS. 13 and 14. The manual registration edge 211 is located at the rear or top edge of the platen P. It comprises a plate-like member 212 which is arranged to slide on and off the platen P. A parallelogram-type linkage is used to provide the sliding movement. A first member 213 is secured to the optical frame 214 by screws 215. Two parallel, but spaced apart pivoting links 216 and 217 are pivotally secured at one end to the first member 215 and at their other end to the movable registration member 212. A tension spring 218 biases each of the links 216 and 217 toward the extended position or operative position for the registration member shown in solid lines. A cable 219 is secured to one of the pivoting links 216 at one end and to an actuating member 220 mounted on the document handler cover 150 as in FIG. 13 at its other end.

When the cover 150 is raised as in FIG. 13, the cable 219 is slack so that the manual registration edge 211 is operatively positioned over the platen P as in FIG. 14.

When the cover is closed as shown in phantom in FIG. 13, the movement of the actuating arm 220 pulls the cable taught and retracts the manual registration edge 211 to the position shown in phantom in FIG. 14. Therefore, the manual registration edge 211 is present over the platen P only when the document feeder cover 150 and document feeder 11 are raised off the platen surface. When the document feeder cover 150 is in its normal operative position over the platen surface the manual registration edge is retracted. This avoids interference between the manual registration edge 211 and the documents being advanced onto the platen by belt transport 40.

DOCUMENT HANDLER DRIVES

The drive motor 230 is connected to the document handler 11 via clutch and pulley 65, timing belts 231 and 232 and intermediate pulleys 233 and 234 as shown in FIG. 13. The timing belt 232 is wrapped about the outboard drive pulley 235 on shaft 71 as in FIG. 2. Timing belts 236 and 237 are used to tap the drives input to shaft 71 for connection to the belt drive pulley 44 and the output drive rollers 180.

OUTPUT TRAY AND DOCUMENT DECELERATOR

Referring now to FIGS. 1, 2, and 15, the document output tray 41 and document decelerators 56 features are shown in greater detail. The output tray 41 includes a step or depression 240 at its downstream end which serves to collect and appropriately stack small sized documents. If a larger document is copied, it would extend over the lip 241 of the depression 240 in the tray 41.

A document decelerator support bar 242 is pivotally supported for movement between the positions shown in solid lines and in phantom. The bar is biased upwardly by spring 247. In the solid line position the bar 242 supports two Mylar strips 243 which act to decelerate documents exiting from the document handler. The documents pass under the upper run 244 of the bar 242 and engage the Mylar strips 243 which act to decelerate and stack the documents in the tray. Improved document stacking and deceleration is accomplished by means of brush-type pads 245 secured to the free ends of the cantilever mounted Mylar strips 243. The brush pads 245 include fibers that are angled with respect to the direction of document advancement, namely, they are inclined forwardly and downwardly of the direction of document advancement. As a document engages the fiber pads 245 it passes easily in the direction in which it is moving because of the inclination of the fibers. However, when the document reaches the end face 246 of the output tray 41 and attempts to reverse its direction of movement, the frictional resistance between the fibers of the pads 245 and the document is increased because of their inclination. The increased frictional resistance causes the documents to stop and stack in a neat pile generally against the end face 246 of the output tray 41.

If it is desired to do book copying, the decelerator support bar 242 is in the way. However, it can be deflected downwardly, as shown in phantom, so that a book can be easily laid over it and the platen P. The registration gate assembly 50 has been inclined with respect to the plane of the platen P as described above. This orientation provides an ideal book registration edge, so that it is not necessary to break the binding of a book as it is placed on the platen for copying. Deflection of the bar 242 allows the book to be easily placed over the platen without interference with the bar.

The control system for operating the document handling system described above does not form a part of the present invention and any desired system could be employed as are known in the prior art.

In the embodiment of the wait station 33 described above the pivoting registration chute 35 is arranged above the document path and the registration gate member 34 is positioned below the sheet path. If desired, the pivoting registration chute could be biased towards it minimum throat defining position by means of a spring instead of being solely biased by the force of gravity. With spring biasing it would be possible to arrange the chute 35 and the registration gate 34 in an inverted relationship, wherein the gate would be positioned above the document path and the chute would be positioned below the path and biased toward the gate by means of the spring.

The patents, applications, and texts referred to specifically in this application are intended to be incorporated by reference into the application.

It is apparent that there has been provided in accordance with this invention an improved document handling apparatus and reproducing machine which fully satisfies the objects, means and advantages set forth hereinbefore. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. In a document handling apparatus including means for pre-registering a document prior to its advancement to a viewing station, said pre-registering means comprising a stop member selectively positionable between positions in and out of a path of said document and a guide chute means positioned along said path and adjacent said stop member for defining a desired throat for guiding said document into engagement with said stop member when it is positioned in said path; and means for transporting said document to said viewing station; the improvement wherein, said pre-registering means further includes:

means for supporting said chute means for movement relative to said stop member in response to the movement of said stop member between its respective positions in and out of said path; said chute supporting means being adapted to move said chute means in a direction away from said stop member in response to the movement of said stop member to its position out of said path; whereby said throat is widened to reduce the drag on said document as it is advanced by said transport means.

2. An apparatus as in claim 1, wherein said chute supporting means is responsive to the movement of said stop member to its position in said path if a document is positioned in said path in interference with said stop member; whereby document damage is avoided by the movement away of said chute means.

3. An apparatus as in claim 1, wherein said means for supporting said chute means comprises means for pivotally supporting said chute means.

4. An apparatus as in claim 1, wherein said stop member is supported below said path and said chute means is supported above said path and wherein said chute support means includes actuating means for inter-connecting said chute means and said stop member whereby movement of said stop member to said position out of said path results in corresponding movement of said chute means away from said stop member to widen said throat.

5. An apparatus as in claim 4, wherein said interconnecting means is adjustable to adjust the throat defined by said chute means.

6. An apparatus as in claim 5, further including means for moving said stop member between its respective positions in and out of said document path.

7. An apparatus as in claim 6, wherein said stop member moving means includes a solenoid for retracting said stop member to its position out of said path and a biasing means for urging said stop member to its position in said path.

8. An apparatus as in claim 1, wherein said stop member includes a plurality of spaced apart fingers having faces for engaging an edge of said document when said member is positioned in said path.

9. An apparatus as in claim 1, wherein said transport means comprises: a set of pinch rollers defining a nip for the advancement of said document therebetween, said set of pinch rollers being arranged upstream of said stop member; and means for supporting said set of pinch rollers so that said nip can be selectively opened to allow a document to be inserted therebetween against said stop member or closed to advance said document to said viewing station, responsive to the movement of said stop member between its respective positions in said document path and out of said document path.

10. An apparatus as in claim 9, wherein said pinch roller set comprises at least one first roller arranged above said document path and at least one second roller arranged below said document path and wherein said stop member is supported below said path and said chute means is supported above said path, and wherein said pinch roller support means includes actuating means for inter-connecting said second pinch roller and said stop member, whereby movement of said stop member to said position out of said path results in corresponding movement of said second pinch roller into a closed nip with said first pinch roller and movement of said stop member to said position in said path results in corresponding movement of said second pinch roller away from said first pinch roller to open said nip.

11. An apparatus as in claim 1, wherein said document handling apparatus is employed in conjunction with a reproducing machine, including said viewing station, said reproducing machine including means for forming an image of said document at said viewing station on a sheet of support material.

12. An apparatus as in claim 11, wherein said reproducing machine comprises an electrostatographic reproducing machine and wherein said image forming means comprises; an electrostatographic imaging surface arranged for movement; means for charging said surface; means for projecting an image of said document at said viewing station onto said imaging surface to form a corresponding electrostatic image thereon; means for developing said electrostatic image to render it visible; and means for transferring said developed image to said sheet of support material.

* * * * *